United States Patent [19]

Perkel

[11] Patent Number: 4,863,106
[45] Date of Patent: Sep. 5, 1989

[54] PROCESS FOR LOW TEMPERATURE COMMINUTION OF SCRAP TIRES

[75] Inventor: Harold Perkel, Levittown, Pa.
[73] Assignee: TDE, Inc., Philadelphia, Pa.
[21] Appl. No.: 257,466
[22] Filed: Oct. 13, 1988
[51] Int. Cl.⁴ ............................................ B02C 19/12
[52] U.S. Cl. ........................................ 241/5; 241/23; 241/24; 241/29; 241/40; 241/65; 241/48; 241/152 A; 241/DIG. 31; 241/DIG. 37
[58] Field of Search ................... 241/5, 40, 80, 97, 3, 241/101.4, 79.1, 23, 24, 17, 18, 48, 79, 101.2, 29, DIG. 31, DIG. 38, DIG. 37, 152 A, 65

[56] References Cited

U.S. PATENT DOCUMENTS

| | | | |
|---|---|---|---|
| 3,658,259 | 4/1972 | Ledergerber | 241/DIG. 37 X |
| 3,992,899 | 11/1976 | Spahn | 241/DIG. 31 X |
| 3,995,816 | 12/1976 | Motek | 241/DIG. 37 X |
| 4,056,231 | 11/1977 | Townsend | 241/DIG. 37 X |
| 4,113,186 | 9/1978 | Smith | 241/DIG. 31 X |

FOREIGN PATENT DOCUMENTS 975449 11/1982 U.S.S.R. ............................... 241/40

Primary Examiner—Mark Rosenbaum
Attorney, Agent, or Firm—Steele, Gould & Fried

[57] ABSTRACT

A process and apparatus for the low temperature comminution of tires includes the separation of the tires into tire portions including tread portions, sidewall portions and bead portions. The tire portions are cooled and crushed to form rubber granules and scrap material. The rubber granules are sorted from the scrap material in a process that includes the step of suspending the granules in a moving stream of low temperature gas. The stream of gas and rubber granules is impacted on a solid surface to grind the granules. The low temperature gas is preferably recycled and cooled by heat exchange with another circulating low temperature gas such as nitrogen.

22 Claims, 6 Drawing Sheets

FLOW DIAGRAM

NITROGEN REFRIGERATOR

TREAD COOLING TUNNEL SHAFT

PROCESS FOR LOW TEMPERATURE COMMINUTION OF SCRAP TIRES

BACKGROUND OF THE INVENTION

1. Field of the invention

This invention relates to waste recovery processes, and more particularly to processes for recovering rubber and other materials from used tires.

2. DESCRIPTION OF THE PRIOR ART

It is currently estimated that about 200,000,000 used tires are produced annually. The tires are commonly dumped in waste disposal sites, but frequently are discarded on vacant land and in lakes and rivers because the used tires have no value and, in fact, cost money to dispose of properly. Discarded tires are a fire hazard and provide a breeding environment for mosquitoes and vermin. Dump sites are becoming filled and environmental considerations are limiting the allocation of future space for this purpose. A surcharge is often placed on each tire that is disposed, which encourages illegal disposal.

There is a need for a process which will dispose of tires in a manner which is not harmful to the environment. It would be desirable if such a process were economically justified, in addition to environmentally beneficial, so that the illegal disposal of tires would also become economically disadvantageous. It further would be desirable if such a process could be installed at several smaller locations, and not only at locations processing very large quantities of tires.

Several inventions have been directed to processes for disposing of used tires. Some of these have included the recovery of rubber from the tires for a use as a low grade fuel or for use as a substitute for virgin rubber and other materials. Letsch, U.S. Pat. No. 4,240,587, discloses a vehicular processing plant and method for processing scrap tires. The tires are reduced in temperature until the rubber becomes brittle, at which point it can be crushed to separate rubber from the remaining residue including metal, metal beads and belts, as well as cords of both synthetic and natural fibers. The residue is pyrolytically reduced to produce high energy gases which are used to operate the plant.

Ledergerber, U.S. Pat. No. 3,658,259, discloses a method for granule pulverization which employs a gas stream for cooling the granules and for pulverizing the granules in a jet mill. The gas stream is filtered following the jet mill to remove particles, and then sent to a refrigeration unit for cooling. The cooled gas stream is then recirculated through the system.

Schorsch, et al, U.S Pat. No. 4,084,387, discloses an apparatus for cooling particles with a low temperature gas such as nitrogen. The nitrogen is fed into a revolving drum which has a helical blade therein adapted to convey the material at a controlled rate through the drum. The particles can thereafter be crushed or impacted and separated.

Meinass, U.S. Pat. No. 4,102,503, discloses a method and apparatus for the low temperature milling of materials in which the materials are treated with a circulated cooling gas to lower the temperature and cause the embrittlement of the materials. The cooling gas is passed around a closed circulation path to prevent the escape of particulate material.

The art has not developed an effective and cost efficient method for comminuting tires. The art especially suffers from mechanical breakdowns which occur through the use of circulating cooling gas streams in which particulates of the comminuted material are suspended. Further, the art has not devised a method for economically processing a large volume of tires in a quick and reliable process.

SUMMARY OF THE INVENTION

It is an object of the invention to provide a process and apparatus for the reclamation of usable materials from scrap tires.

It is another object of the invention to provide a process which will be economically justifiable so as to encourage the reclamation of scrap tires.

It is a further object of the invention to provide a process and apparatus for the reclamation of scrap tires which will be durable.

It is yet another object of the invention to provide a process for the reclamation of scrap tires which can be accomplished by relatively portable apparatus.

It is still another object of the invention to provide a process for the reclamation of scrap tires which will be economically feasible with less than very large quantities of scrap tires.

These and other objects are accomplished by a process for the low temperature comminution of tires in which the tires are first separated into tire portions. The tire portions preferably include tread portions, sidewall portions, and bead portions. The tire portions are cooled and crushed to form rubber granules and scrap material. The rubber granules are sorted from the scrap material and thereafter stored or immediately suspended in a moving stream of low temperature gas. The stream of gas and rubber granules is impacted on a solid surface to grind the granules. The low temperature gas is cooled by heat exchange with another low temperature gas circulating in a substantially closed loop cycle.

The step of separating the tire into portions preferably includes a step wherein a transverse cut is made through the tread by suitable apparatus. The tire is then positioned between two blades on each lateral side of the tire. The tire is caused to rotate about its usual axis of rotation. The blades on each lateral side of the tire are positioned so as to separate the tread portion from the sidewall portion, and the bead portion of the tire from the sidewall portion. The transverse cut through the tread facilitates handling of the tread.

The tread portions, sidewall portions, and bead portions are cooled preferably to approximately $-150$ degrees F. The rubber becomes brittle at this temperature. The cooled tire portions are then impacted in suitable structure such as a roll crusher to separate the brittle rubber from the steel belting, cord, steel bad and other non-rubber tire portions that may be present. These non-rubber materials are collected and used for scrap.

The rubber separated from the tire portions is typically in granules approximately one-half inch on a side to 1/100 inches in diameter. The granules are then fine ground, preferably to a size between about 30 mesh and about 200 mesh.

Fine grinding of the brittle rubber granules is accomplished in a fine grinding fluid energy mill. The particles in this mill will normally be at a temperature equal to or less than $-135$ degrees F. A low temperature working gas such as cooled nitrogen is raised in pressure at a blower step and then passed through a heat exchanger to reduce the temperature of the nitrogen to less than or equal to −135 degrees F. The coarse rubber granules are added to the working nitrogen downstream of the heat exchange step.

Apparatus is provided to increase the velocity of the working nitrogen past the sonic velocity of the nitrogen. The apparatus is preferably a converging-diverging nozzle. The converging-diverging nozzle step preferably lowers the pressure of the working nitrogen by a factor of 10.

Rubber granules leaving the converging-diverging step at an increased velocity are caused to strike suitable structure such as an impact plate. The brittle rubber granules shatter into fine particles. The rubber particles are classified by size, preferably mesh size, in a classification step. Particles that remain larger than the desired size can be returned to the coarse granule stream for repeated fine grinding.

Nitrogen leaving the strike plate is filtered to remove fine particles of brittle rubber suspended in the nitrogen. The nitrogen is then passed to the blower for recycling through the fine grinding fluid energy mill.

Low temperature gas used to cool the tire portions and used in the fluid energy mill is cooled by heat exchange with a gas circulting in a refrigeration cycle.

The refrigeration cycle is preferably a substantially closed loop cycle comprising both compression and heat exchange to cool the circulating gas, preferably nitrogen, to very low temperatures, preferably about −170 degrees F. The heat exchange can be with another circulating fluid, for example, water circulating through a cooling tower.

In a preferred embodiment, the nitrogen is first compressed. The hot, compressed nitrogen is subjected to heat exchange to cool the gas, after which the cooled, compressed gas is compressed once again. The hot, twice compressed gas is then cooled through a second heat exchange step. An expansion step is then performed to super cool the nitrogen to approximately 31 170 degrees F. Energy from the expansion-supercooling step can be used to drive one or more of the compression steps.

Apparatus for the low temperature comminution of tires is provided. The apparatus comprises a cutting means for separating the tread, sidewall and bead portions of the tire from one another. The cutting apparatus preferably includes a blade for making an initial transverse cut through the tread. The tire is then placed onto a separation device which has a spindle adapted to engage the bead portion of the tire. Cutting blades are provided radially outward from the spindle on each lateral side of the tire. A pair of bead removal blades are provided substantially adjacent to and radially outward from the bead portion of the tire. Tread removal blades are provided substantially adjacent to and radially inward from the tread portion of the tire. The spindle is rotated as the blades cut the tire to separate the tread portions, sidewall portions, and bead portions from one another.

The tread portions, sidewall portions and bead portions are carried separately by conveying means to a tread cooling tunnel, a sidewall cooling tunnel, and a bead cooling tunnel, respectively. The tread cooling tunnel comprises an elongated cylinder rotating slowly in an elongated tunnel cooled by a stream of low temperature gas. Pins are provided on interior surfaces of the tunnel and extend inwardly to a position substantially adjacent to the rotating cylinder. The pins are disposed in a helical configuration, such that treads placed onto one end of the shaft are advanced across the rotating cylinder by the guiding action of the pins.

The chilled tread portions, sidewall portions, and bead portions are next transported to tread crushing means, sidewall crushing means and bead crushing means, respectively. The cold, brittle rubber separates from the stiff cord components of the tread, sidewall and bead portions. The coarse rubber granules can be separated through suitable separation means such as a screen. The tread, sidewall and bead cords are collected as scrap.

The coarse rubber granules can be stored or sent directly to fine grinding means. Preferable fine grinding means comprise a fine grinding fluid energy mill. The fine grinding fluid energy mill utilizes a flowing fluid, preferably low temperature nitrogen, to carry the coarse rubber granules at high velocity and to impact the particles on an impact plate. The force of the impact shatters the coarse granules into fine particles. The fine particles are sorted by size, and particles too large in diameter can be returned to the fine grinding mill inlet for further reduction in size.

It is preferable that the cold nitrogen carrying the rubber granules in the fluid energy mill is recirculated through the mill to increase the economy of the process and apparatus. Blower means can be provided to circulate the cold gas, as well as to impart a sufficient velocity to the gas such that the rubber granules will be carried by the flowing as stream. The gas is passed through heat exchange means which receives a cooling stream of cold gas recirculating through a refrigeration apparatus. The moving gas stream carrying the rubber granules is preferably accelerated prior to impact with the strike plate. Suitable accelerating apparatus can be a venturi, wherein the ratio of the outlet pressure to the inlet pressure is greater than or equal to approximately 0.1.

The accelerated gas stream bearing the rubber granules is directed to an impact plenum having the impact plate mounted therein. The accelerated gas stream and granules strike the impact plate preferably at substantially a right angle such that the kinetic energy of the granules is fully transmitted to the impact. Excess gas pressure will accumulate in the plenum, particularly from transport gas carrying the granules into the grinding mill. The excess pressure is relieved by suitable vent means, where the gas is filtered and released to the atmosphere or recycled.

A return line is provided to return the circulating nitrogen from the impact plenum to the grinding mill inlet and the blower. Filter means can be provided in the return line to prevent either of damage to the blower and clogging of the grinding mill heat exchanger.

The refrigeration apparatus preferably comprises a substantially closed loop process with a refrigerating gas, preferably nitrogen, which circulates to the heat exchanger of the fine grinding fluid energy mill and a heat exchanger cooling the nitrogen circulating through the cooling tunnels. The refrigerating apparatus preferably comprises alternating compressors and heat exchangers to sequentially compress and then cool the hot, compressed gas. An expansion turbine is used to supercool the compressed gas to at or below −170 degrees F. The expansion turbine can be coupled to one or more of the compressors such that a portion of the energy derived from the expansion turbine is used to drive the compressors.

The heat exchange cooling the nitrogen refrigerant is with a second recirculating fluid. The second recirculating fluid is a low pressure, substantially ambient temperature stream that is less hazardous than the recirculating nitrogen. The second refrigerant is preferably selected from water or various antifreeze compounds that can be safely passed through a cooling tower for more economical heat exchange.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Figure 1:
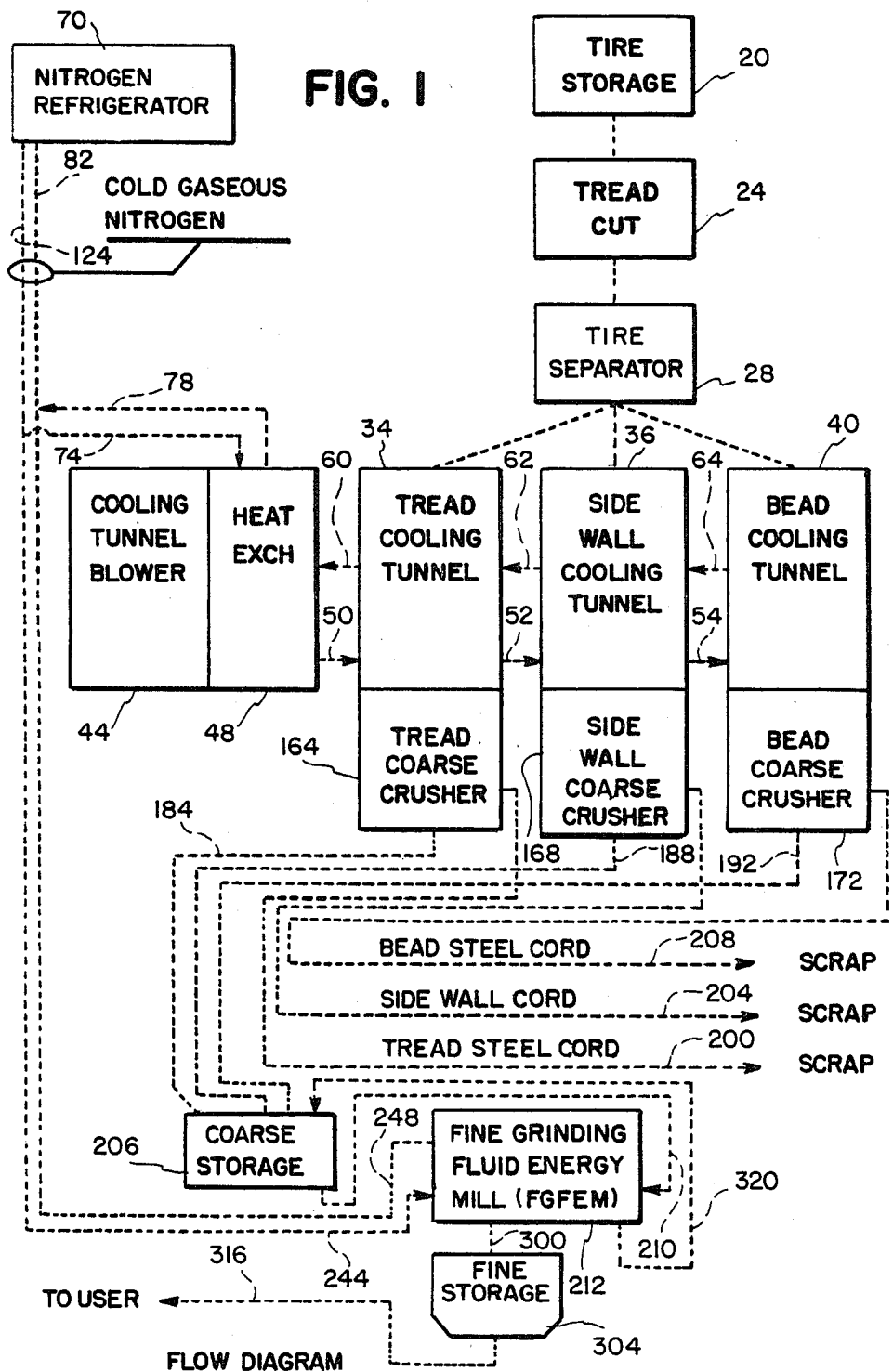
FIG. 1 is a block diagram of a process according to the invention.

The process of the invention is illustrated by the block diagram of FIG. 1. Tires or other rubber items are initially retained in tire storage 20. The tires are cut in an initial tread cutting step 24. Other tire preparation processes can be included at the stage of the tread cut step 24. The tires are separated into tread portions, sidewall portions, and bead portions in a tire separation step 28.

The tread portions, sidewall portions, and bead portions formed in the tire separation step 28 are transported to a tread cooling tunnel step 34, a sidewall cooling tunnel step 36, and a bead cooling tunnel step 40, respectively. The tread cooling tunnel step 34, sidewall cooling tunnel step 36, and bead cooling tunnel step 40 subject the respective tire portions to very low temperatures, preferably at or below −170 degrees F. The rubber component of the tire portions become brittle at these low temperatures.

The tread cooling tunnel 34, sidewall cooling tunnel 36, and bead cooling tunnel 40 receive cold gas, preferably nitrogen gas, to effect the cooling. The nitrogen gas is circulated by a cooling tunnel blower 44. The cooling tunnel blower 44 propels the nitrogen gas through a heat exchange 48. Cold nitrogen from the heat exchanger 48 is passed to the tread cooling tunnel through a first heat exchanger inlet path 50, to the sidewall cooling tunnel through a second heat exchange inlet path 52, and to the bead cooling tunnel 40 through a third heat exchange inlet path 54. The circulating nitrogen is returned to the heat exchanger 48 from the tread cooling tunnel through a first heat exchange return path 60, from the sidewall cooling tunnel through a second heat exchange return path 62 and from the bead cooling tunnel 40 through a third heat exchange return path 64. The heat exchange paths 50, 52 and 54, and return paths 60, 62 and 64, may be independent of one another, connected in series, or in parallel.

The heat exchanger 48 receives a cooling fluid, preferably nitrogen, from a nitrogen refrigerator 70, through a refrigerant inlet path 74. Nitrogen is returned to the nitrogen refrigerator 70 through a refrigerant outlet path 78.

Figure 2:
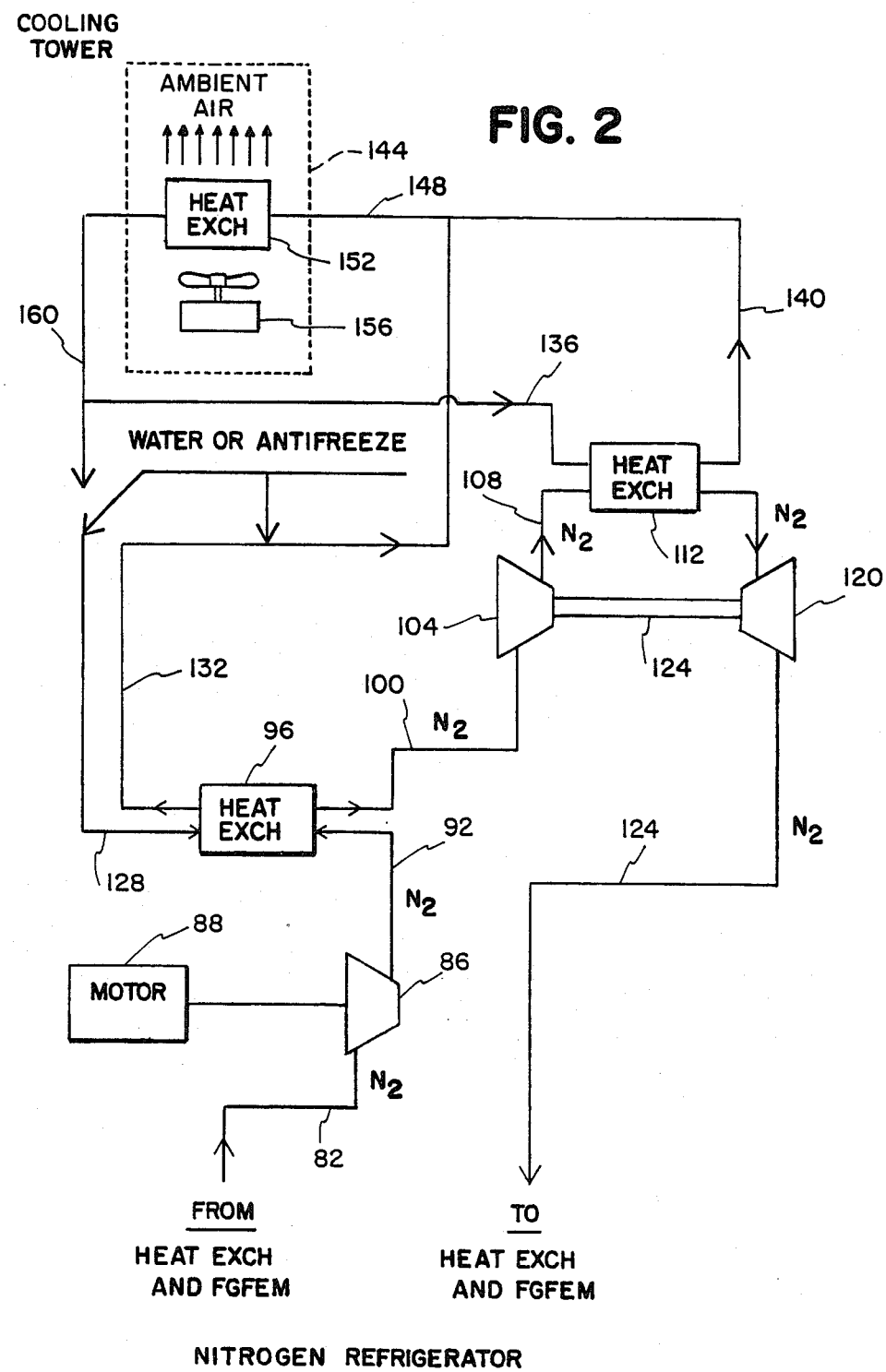
FIG. 2 is a schematic diagram of a refrigeration process and apparatus according to the invention.

The operation of the nitrogen refrigerator 70 is shown in FIG. 2. The circulating nitrogen refrigerant enters the nitrogen refrigerator through an inlet path 82. The nitrogen is compressed in a compressor 86 which can be driven by a motor means 88. The nitrogen exits the compressor through a compressor outlet path 92 and enters a heat exchanger 96. The compressed nitrogen is cooled in the heat exchanger 96 and exits through a heat exchanger exit path 100. The nitrogen is passed from the heat exchanger exit path 100 to a second compressor 104. The hot, high pressure nitrogen exits the second compressor 104 through a second compressor outlet path 108 and enters a second heat exchanger 112. The second heat exchanger 112 cools the high pressure nitrogen, which leaves the second heat exchanger 112 by way of a second heat exchanger exit path 116. The cool, high pressure nitrogen thereafter enters an expansion turbine 120 which supercools the nitrogen. Energy from the expansion turbine 120 can be used to drive one or more of the compressors such as the second compressor 104 through a suitable coupling shaft 124. Nitrogen exits the expansion turbine 120, and the nitrogen refrigerator 70, through a refrigerator exit path 124.

The nitrogen circulating through the nitrogen refrigerator is preferably cooled by contact with a second refrigerant that can safely and economically be contacted with ambient air. The circulating nitrogen is coupled in the first heat exchanger 96 and second heat exchanger 112 to the second circulating refrigerant, which can be water or antifreeze, and most preferably water. The first heat exchanger 96 receives water through a first heat exchanger water inlet path 128. The water exits the first heat exchanger 96 through a first heat exchanger water exit path 132. The second heat exchanger 112 receives water through a second heat exchanger water inlet path 136. Water exits the second heat exchanger 112 through a second heat exchanger water exit path 140. The heated water leaving the first heat exchanger 96 and second heat exchanger 112 is preferably contacted with ambient air in a suitable heat exchange device such as the cooling tower 144. The cooling tower 144 can be of any suitable design. The first heat exchanger water exit path 132 and second heat exchanger water exit path 140 connect to a cooling tower water inlet path 148 which passes through the heat exchange portion 152 of the cooling tower 144. Suitable fan means 156 can be provided to blow ambient air through the cooling tower 144 to cool the water or other refrigerant. Water leaves the cooling tower 144 through a cooling tower exit path 160.

The cold tread portions, sidewall portions, and bead portions are transported from their respective cooling tunnels to a tread coarse crusher 164, a sidewall coarse crusher 168, and a bead coarse crusher 172, respectively. The crushers grind the respective tire portions and cause the brittle rubber to break apart into coarse granules and separate from tread cords, sidewall cords, and bead cords, as well as from other rigid tire materials which may be embedded in the rubber.

The coarse rubber granules from the tread coarse crusher 164, the sidewall coarse crusher 168, and the bead coarse crusher 172 can exit the crushers through a tread course crusher outlet path 184, a sidewall coarse crusher outlet path 188, and a bead coarse crusher outlet path 192, respectively. The coarse rubber granules can be collected in a coarse storage container 206.

The tread steel cord and other non-rubber tread components are scrapped through a tread steel cord outlet path 200. Similarly, the sidewall cord components are scrapped through an outlet path 204, and the bead steel cord and other non-rubber bead components are scrapped through an outlet path 208. The scrapped tread, sidewall, and bead components are preferably reclaimed where possible.

Figure 3:
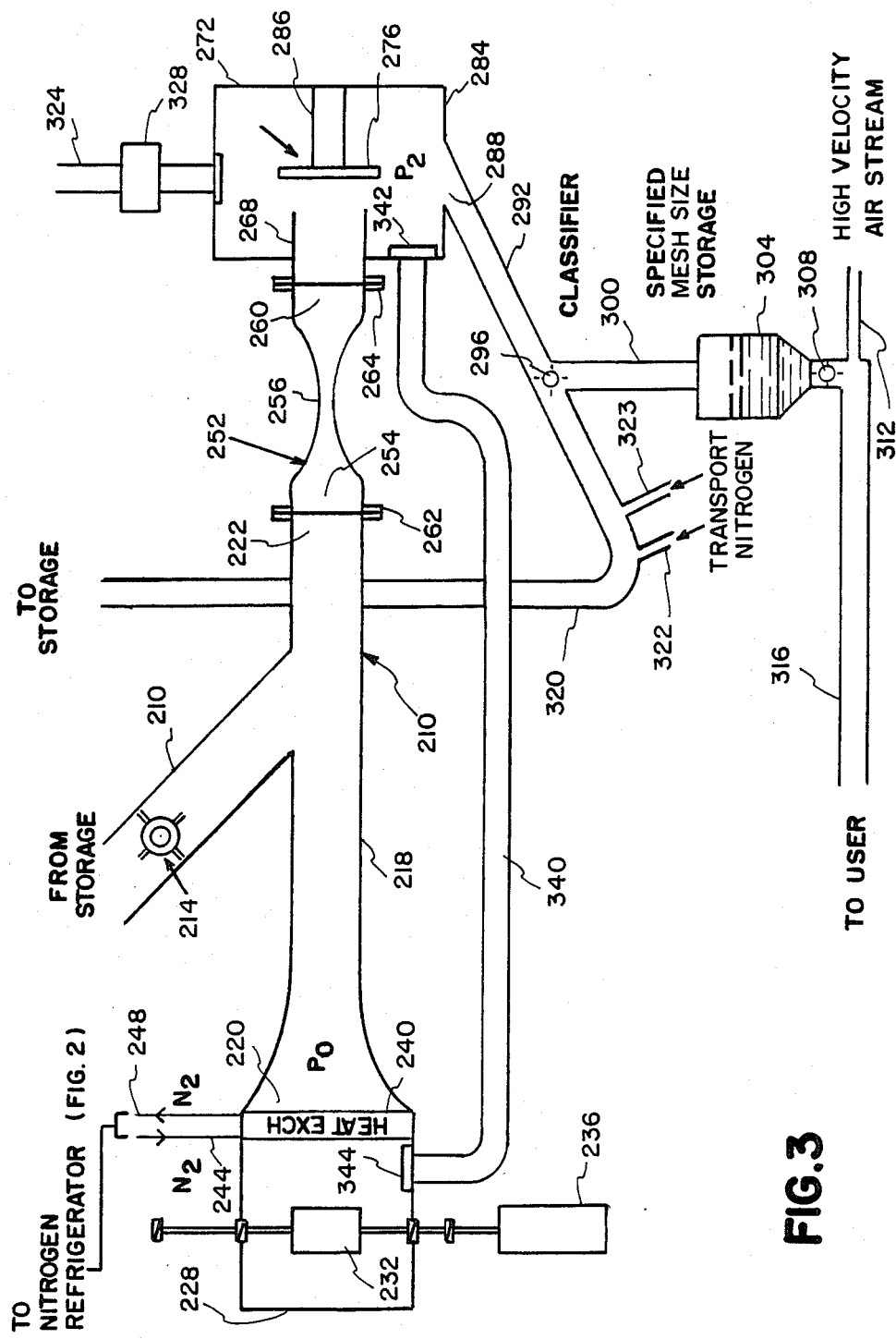
FIG. 3 is a schematic diagram of a fluid energy grinding mill.

The coarse rubber granules leave the course storage container 206 through a course storage exit path 210. The coarse rubber granules preferably enter a fine grinding fluid energy mill 212, such as that shown in FIG. 3. A valve 214 of suitable design can be used to meter the flow of coarse rubber granules into the mill. The coarse rubber granules are mixed with cold nitrogen gas in a mixing chamber 218. The mixing chamber 218 is an elongated hollow structure with a first open end 220 and a second open end 222. The first open end 220 is connected to a nitrogen source such as a return plenum 228 which receives nitrogen recirculating through the fluid energy mill. A blower 232 is provided in the return plenum 228 and can be powered by a suitable motor 236. The blower 232 drives the nitrogen into the mixing chamber 218. A heat exchanger 240 is positioned in the return plenum 228 such that nitrogen propelled by the blower 232 is forced through the heat exchanger 240 prior to entry into the mixing chamber 218. The heat exchanger 240 receives nitrogen from the nitrogen refrigerator 70 through a fine grinding fluid energy mill nitrogen inlet path 244 which connects to the nitrogen refrigerator exit path 124. Nitrogen exits the heat exchanger 240 through a fine grinding fluid energy mill heat exchanger exit path 248. The temperature of the nitrogen circulating through the fluid energy mill is preferably lowered by the mill heat exchanger 240 to at least $-135$ degrees F.

The cold nitrogen flows through the mill heat exchanger 240 and the mixing chamber 218 under the propelling force of the blower 232. The coarse rubber granules supplied through the coarse storage exit path 210 are carried by the flowing nitrogen out of the second end 222 of the mixing chamber 218. It is desirable to further increase the velocity of the flowing nitrogen and coarse rubber granules with the provision of suitable accelerating means. The accelerating means can be selected from suitable structure such as the venturi 252. The flowing nitrogen and coarse granules enter the venturi 252 through a first opening 254, which communicates with the second end 222 of the mixing chamber 218 and pass through a converging-diverging nozzle 256. The flowing nitrogen and coarse granules accelerate upon leaving the venturi at a second opening 260. The venturi 252 can be fixed in the flow path by suitable fastening structure such as the flange seals 262 and 264.

The accelerated coarse granules and nitrogen leave the venturi 252 through the second end 260 and enter an inlet conduit 268 of an impact plenum 272. An impact plate 276 is positioned in the impact plenum 272 by suitable structure such as the pedestal 280. The flow of the and the nitrogen is directed by the inlet conduit 268 to the impact plate 276. The surface of the impact plate 276 is preferably perpendicular to the direction of travel of the coarse granules and nitrogen impacting the plate 276 such that the kinetic energy of the granules is substantially absorbed by the impact of the granule without deflection. The coarse granules shatter into fine particles which are collected at the bottom 284 of the impact plenum 272 and flow outward through an outlet 288.

The fine particles leaving the impact plenum 272 through the outlet 288 pass through an outlet conduit 292 to a classifier 296. The classifier 296 sorts the particles by their size through suitable structure. Fine particles are passed through a fine particle conduit 300 to a fine particle storage container 304. The fine rubber particles can be metered from the fine particle storage container 304 by a metering valve 308 or other suitable structure. Fine rubber particles leaving the fine particle storage container 304 are driven by a high velocity airstream delivered through an air path 312, which transports the fine particles to a fine particle outlet path 316 to the user where the fine particles can be used as a fuel. The larger particles not passed by the classifier 296 to the fine particle storage container 304 are returned to the coarse storage container 206 by a coarse storage return conduit 320. Transport nitrogen to propel the larger particles through the course storage return conduit 20 can be provided through transport nitrogen supply conduits 322, 323.

Excess nitrogen will accumulate in the impact plenum 272 and raise the pressure to the point that the ratio of P2/P0 will not be maintainable. It is therefore desirable to provide a vent conduit 324. A suitable filter means 328 can be provided in the flow path of the vent conduit 324 such that nitrogen removed through the vent conduit can be exhausted to the atmosphere. It may alternatively be desirable to recycle this nitrogen to the fluid energy mill or to other parts of the process.

Nitrogen is recycled from the impact plenum 272 to the return plenum 228 by a nitrogen return conduit 340. A first filter 342 is provided at the inlet of the nitrogen return conduit 340 at the impact plenum 272. A second filter 344 is provided at the outlet of the nitrogen return conduit 340 and at the return plenum 228. Filters 340 and 344 remove rubber particulates from the circulating nitrogen stream to avoid damage to the blower 232 and the heat exchanger 240.

Figure 4A:
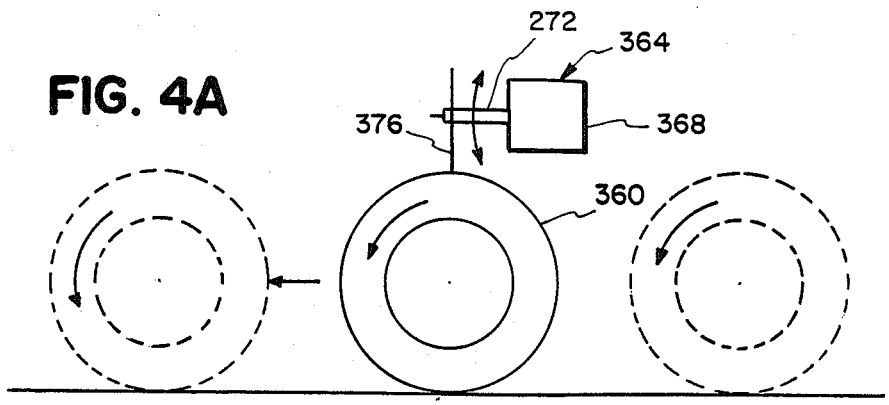
FIG. 4a is a schematic diagram of a cutting process and apparatus according to the invention.

The tread cut step 24 (FIG. 1) can be accomplished by suitable structure known in the art, but preferably is accomplished as shown in FIG. 4a. The tire 360 is transported to a cutting station 364. The cutting station 364 includes a suitable cutting motor 368 which operates a reciprocating cutting arm 372. A suitable blade 376 is fixed to the cutting arm which moves substantially perpendicularly to the adjacent surface of the tire 360. The movement of the cutting arm 372 is controlled so that the cutting blade 376 cuts substantially perpendicularly through the tire to a depth just below the tread of the tire.

The tire is then transported to the tire separation step 28. The method of transporting the tires can be a suitable conveyor means, or a channel which permits the tire to roll in the usual fashion either under the influence of gravity or by the force of a suitable propelling mechanism.

Figure 4B:
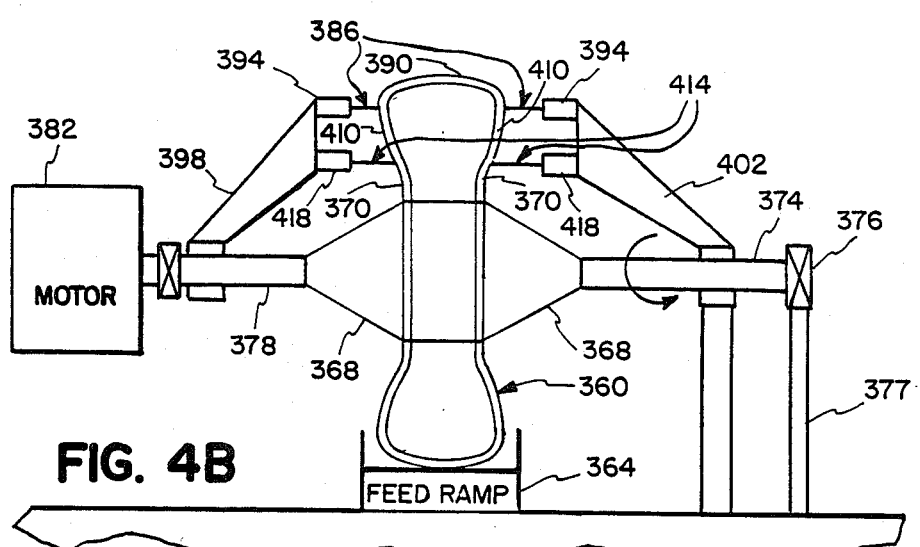
FIG. 4b is a schematic view of a tire separating apparatus according to the invention.

The tire separator step 28 of FIG. 1 is preferably accomplished by the apparatus depicted in FIG. 4b. The tire 360 arrives at the station through a suitable feed ramp 364. The tire 360 is mounted to a spindle 368 which is adapted to engage a bead portion 370 of the tire 360. The spindle 368 is mounted to a first shaft 374 which is rotatably journalled in a suitable bearing 376. The bearing 376 is supported above the surface by a support 377. The spindle 368 is also fixed to a drive shaft 378 which is connected to a suitable motor means 382 adapted to rotate the drive shaft 378, the spindle 368 and the first shaft 374, and thus the tire 360.

Cutting blades for separating the tire into distinct portions are provided on each lateral side of the tire 360. Tread removal blades 386 can be provided radially inward from the tread portion 390 of the tire 360. The tread cutting blades 386 are mounted on suitable blade arms 394 provided on each lateral side of the tire 360. The blade arms 394 are in turn fixed to a journal arm 398 which is actuated by a portion of the motor means 382.

The journal arm 398 is adapted to move the cutting arm 394, and thus the blade 386, into the tire 360. The tire 360 will be driven by the journal arm 398 into the cutting blade 386 on the stationery arm 402. The tire is rotated by rotation of the shaft 378 to cut and separate the tread portion 390 of the tire 360 from a sidewall portion 410. Tread cutting blades 414 can similarly be fixed to second blade arms 418. The second blade arms 418 are fixed to the journal arm 398 and the stationery arm 402 so as to position the tread removal blades 414 between the sidewall portions 410 and the bead portions 370.

Figure 4C:
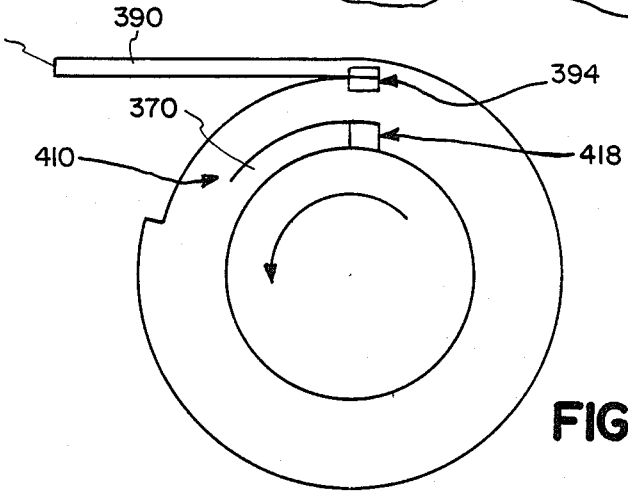
FIG. 4c is a schematic side elevation of a tire separating process and apparatus according to the invention.

Rotation of the tire 360 will effect separation of the tread portion 390, the sidewall portions 410, and the bead portions 370 from one another. The centrifugal force on the tread portion 390 caused by rotation of the tire during the cutting process forces the edge 392 created by the cutting station 364 to move tangentially in the direction of the tread cooling tunnel 34 as it is separated from the sidewall portion 410 of the tire 360 (FIG. 4c). The tread 390 is thereby passed to the tread cooling tunnel stage 34 (FIG. 1). The sidewall portions 410 and bead portions 370 are separately conveyed to the sidewall cooling tunnel stage 36 and bead cooling tunnel stage 40, respectively.

Figure 5:
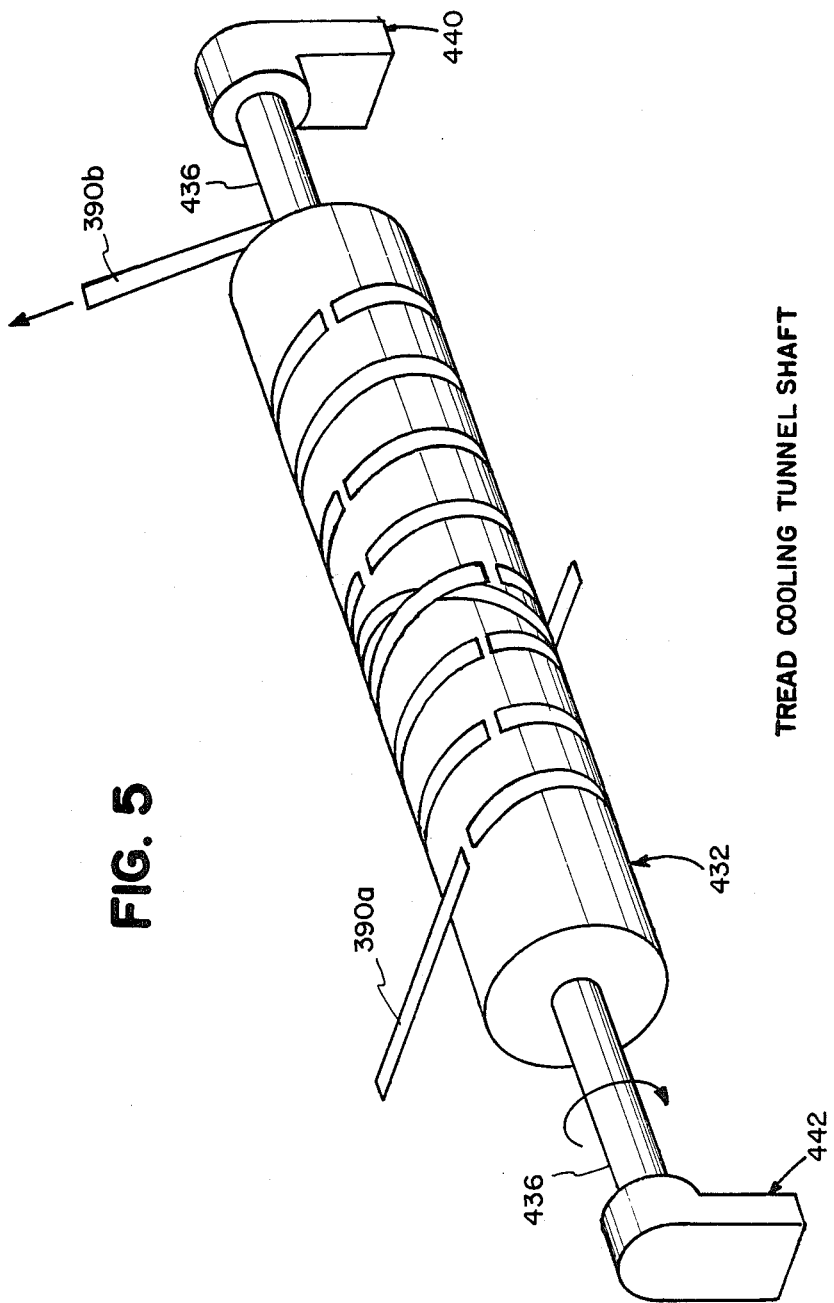
FIG. 5 is a perspective view of a cooling tunnel.
Figure 6:
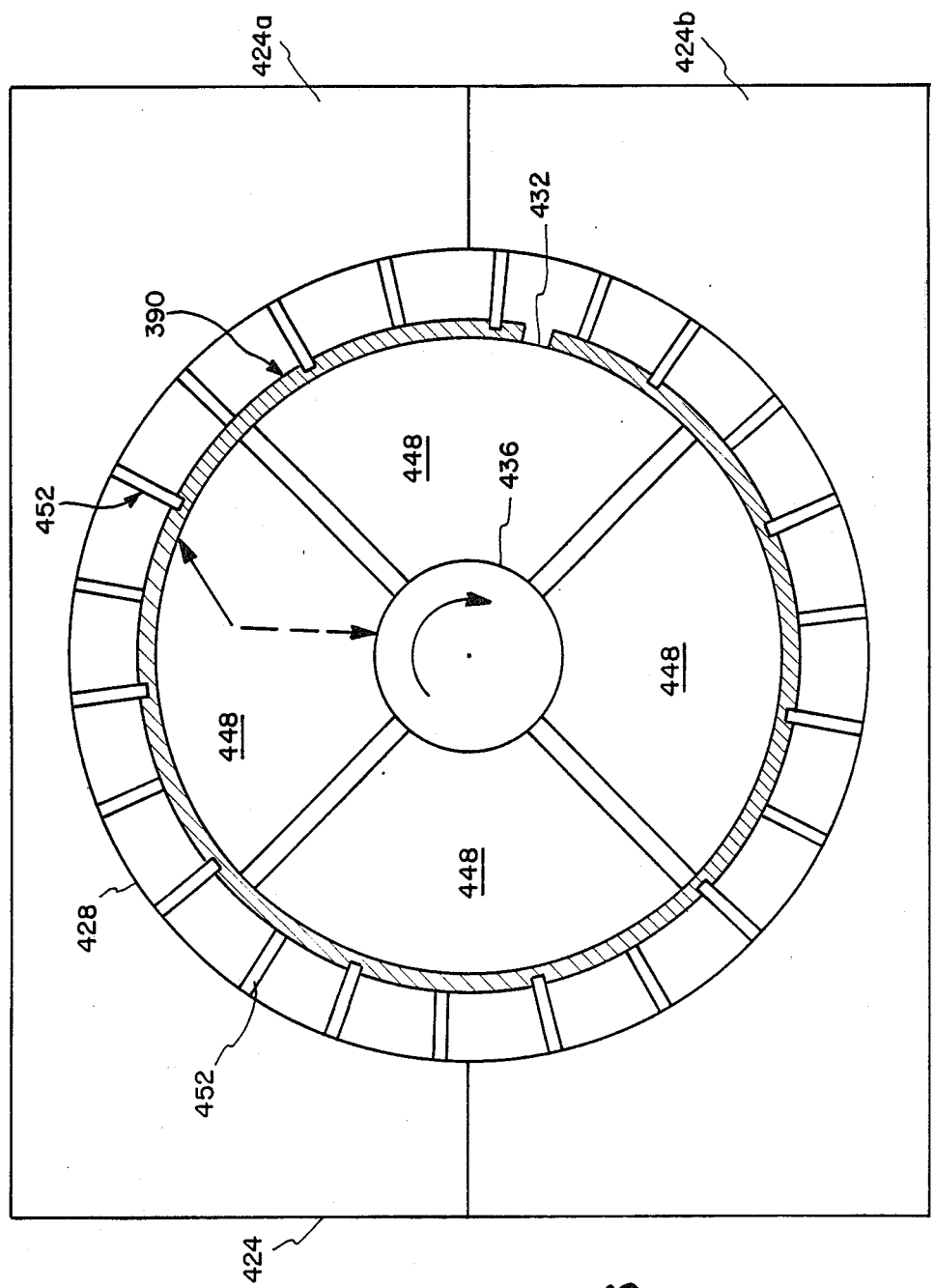
FIG. 6 is a sectional schematic of a cooling tunnel.

The operation of the tread cooling tunnel is depicted in FIGS. 5-6. The tread cooling tunnel preferably comprises an enclosure 424 which can be formed by opposing half portions 424a and 424b that are joined by suitable fastening structure. The housing 424 has formed therein an elongated cylindrical opening 428. An elongated cylindrical shaft 432 is mounted within the cylindrical opening 428 about a driving shaft 436. The driving shaft 436 can be journalled to suitable motor means 440, 442 (shown schematically in FIG. 5) adapted to rotate the cylindrical shaft 432 about its long axis. The cylinder 432 can be constructed from elongated quarter portions 448 mounted about the drive shaft 436.

The tread portions 390, such as the tread 390a in FIG. 5, enter the housing 424 through a suitable opening (not shown). The tread portions 390 wrap about the cylinder 432 owing to their own elasticity and tendency to take a circular shape. A number of pins 452 extend inwardly from the interior surface of the cylindrical opening 428 to a position substantially adjacent to the rotating cylinder 432. The pins 452 are positioned in a helical configuration through the length of the cylindrical opening 428. The pins 452 guide the tread portions 390 as the tread portions 390 rotate with the rotating shaft 432. The tread portions 390 traverse the helical path of the pins 452 and progress through the cooling tunnel 424. Cooling gas such as nitrogen is passed through the shaft 428 through suitable inlet and outlet openings (not shown). The tread portions 390, such as the tread portion 390b, exit the cooling tunnel 424 through a suitable opening (not shown) and are transported to the tread course crusher stage 164.

This invention can be embodied in other specific forms without departing from the spirit or essential attributes thereof and accordingly, reference should be made to the following claims, rather than to the foregoing specification, as indicating the scope of the invention.

I claim:

1. A process for the low temperature comminution of tires, comprising the steps of:
   a) separating whole tires into portions;
   b) cooling said tire portions with low temperature cooling gas stream;
   c) particlizing said tire portions, whereby rubber granules separate from non-rubber portions of said tire;
   d) separating said rubber granules from said non-rubber portions of said tire;
   e) comminuting said rubber granules into fine particles, said comminuting comprising placing said rubber granules in a high velocity impacting gas stream, and impacting said high velocity granules with a solid surface, whereby said granules shatter into particles; and
   f) recycling said cooling gas stream of step b) and said impacting gas stream of step e) through a heat exchanger.

2. The process of claim 1, wherein said low temperature gas is nitrogen having a temperature equal to or lower than about −135 degrees F.

3. The process of claim 2, wherein said comminuting step e) comprises the step of accelerating said impacting gas stream and rubber granules, said acceleration being in a converging-diverging nozzle having an inlet pressure and an outlet pressure, said inlet pressure being no more than ten times greater than said outlet pressure.

4. The process of claim 3, wherein said low temperature gas of said cooling step b) and said comminuting step e) are recirculated.

5. The process of claim 4, wherein said impacting gas stream is recirculated by a blower step, and at least one filtration step is provided to remove rubber particulates from said circulating impacting gas stream.

6. The process of claim 1, wherein said refrigeration cycle of step f) comprises at least one refrigerant compression step, and at least one heat exchange step adapted to cool the compressed gas product of said at least one compression step, and at least one expansion step to expand and cool the compressed gas product of said at least one compression step and at least one heat exchange step.

7. The process of claim 6, wherein said at least one heat exchange step of said refrigeration cycle is with a circulating stream of water, said water being cooled by ambient air in a cooling tower step.

8. The process of claim 7, wherein said refrigeration cycle comprises a first compression step followed by a first heat exchange step, a second compression step following said first heat exchange step, a second heat exchange step following said second compression step, and an expansion step following said second heat exchange step.

9. The process of claim 6, wherein energy released by the expansion of gas in said expansion step is coupled to drive at least one of said compression steps.

10. The process of claim 1, wherein said rubber particles produced by said comminuting step f) are combusted in an oxidation step to produce energy.

11. The process of claim 1, wherein non-rubber components of said tire portions collected in said separating step d) are further separates for scrap.

12. The process of claim 1, wherein said separation step a) separates said tires into tread portions, sidewall portions, and bead portions.

13. The process of claim 12, wherein said separation step a) comprises an initial transverse cut step through said tread portion.

14. The process of claim 1, further comprising a particle sorting step following said comminuting step e), particles larger than a predetermined size being recycled to said comminuting step e), and particles smaller than said predetermined size being collected in particle storage means.

15. The process of claim 12, wherein said cooling step b) comprises the step of wrapping tread portions about a cylinder rotating in a tunnel receiving said cooling gas stream, and causing said tread portions to traverse a length of said cylinder through said tunnel.

16. An apparatus for the low temperature comminution of tires having tread portions, sidewall portions, and bead portions, comprising:
means for separating said tires into said tread portions, sidewall portions, and bead portions, said separation means comprising a rotatable spindle means adapted to engage said bead portions and to rotate said tire about the usual axis of rotation of the tire, and blade means on each lateral side of said spindle means, said blade means comprising bead removal blades adapted for insertion into said tire radially outward from said bead portion, and tread removal blades adapted for insertion into said tire radially inward from said tread portion;
motor means for rotating said spindle means and motor means for operating said blades;
means for cooling said tread portions, sidewall portions, and bead portions, said cooling means comprising a source of a moving stream of low temperature gas;
means for forming particles from said tread portions, sidewall portions, and bead portions cooled by said cooling means, whereby the brittle, low temperature rubber portions will separate from non-rubber components of said tire;
means for separating said rubber granules from said non-rubber portions of said tire; and,
means for comminuting said rubber granules, said comminuting means comprising a source of a low temperature gas, means for accelerating said low temperature gas, said acceleration means comprising a converging-diverging nozzle, and an impact plate means positioned so as to impact with granules carried by said low temperature gas and accelerated by said converging-diverging nozzle, whereby said granules will be particlizes.

17. The apparatus of claim 16, wherein said low temperature gas for cooling said tread portions, sidewall portions, and bead portions, and said low temperature gas of said grinding means, are cooled to a temperature no more than about −135 degrees F. by heat exchange with a refrigerant travelling in a refrigeration cycle.

18. The apparatus of claim 16, wherein said means for cooling said tread portions comprises an elongated, hollow tunnel having an elongated cylinder rotating therein and having means for circulating said low temperature gas through said elongated tunnel, said elongated tunnel having a plurality of guide means extending from an interior surface thereof substantially to said rotating cylinder and dispersed in a substantially helical pattern so as to direct said tread portions rotating on said cylinder in a helical path along the surface of said rotating cylinder.

19. An apparatus for the low temperature comminution of tires having tread portions, sidewall portions, and bead portions, comprising:
means for separating said tires into said tread portions, sidewall portions, and bead portions;
means for cooling said tread portions, sidewall portions, and bead portions, said means for cooling said tread portions comprising an elongated, hollow tunnel having an elongated cylinder rotating therein, having means for circulating a low temperature cooling gas through said elongated tunnel, said elongated tunnel having a plurality of guide means extending from an interior surface thereof substantially to said rotating cylinder and positioned in a substantially helical pattern so as to direct said tread portions rotating on said cylinder in a helical path along the surface of said rotating cylinder;
means for forming particles from said tread portions, sidewall portions, and bead portions cooled by said cooling means, whereby the brittle, low temperature rubber portions will separate from non-rubber components of said tire;
means for separating said rubber granules from said non-rubber portions of said tire; and,
means for comminuting said rubber granules, said comminuting means comprising a source of low temperature gas, means for accelerating said low temperature gas and said rubber granules, said acceleration means comprising a converging-diverging nozzle, and an impact plate means positioned so as to impact with granules carried by said low temperature gas and accelerated by said converging-diverging nozzle, whereby said granules will be particlized by impact.

20. The apparatus of claim 19, wherein said means for separating said tires into said tread portions, sidewall portions, and bead portions, comprises a rotatable spindle adapted to engage said bead portions and to rotate said tire about the usual axis of rotation of the tire, and blade means on each lateral side of said spindle portion, said blade means comprising bead removal blades adapted for insertion into said tire radially outward from said bead portion, and tread removal blades adapted for insertion into said tire radially inward from said tread portion; and,
motor means for rotating said spindle and motor means for operating said blades.

21. The apparatus of claim 19, wherein said low temperature gas for said means for cooling said tread portions, sidewall portions, and bead portions and for said grinding means is cooled by heat exchange with a refrigerant travelling in a refrigeration cycle.

22. An apparatus for the low temperature comminution of tires, comprising:
a) means for separating whole tires into portions;
b) means for cooling said tire portions with a cooling gas stream;

c) means for particlizing said tire portions, whereby rubber granules separate from non-rubber portions of said tire;
d) means for separating said rubber granules from said non-rubber portions of said tire;
e) means for comminuting said rubber granules into fine particles, said comminuting means comprising a means for providing a high velocity impacting gas stream, and impact means impacting granules placed in said gas stream whereby said granules form into particles; and,
f) heat exchanger means for cooling said gas stream of step b) and said impacting gas stream of step e).

* * * * *